March 27, 1945.  D. F. ALEXANDER  2,372,307

TEMPERATURE CONTROL

Filed April 30, 1942

INVENTOR.
Donald F. Alexander
BY Spencer Hardman and Fehr
Attorneys

Patented Mar. 27, 1945

2,372,307

UNITED STATES PATENT OFFICE 2,372,307

TEMPERATURE CONTROL

Donald F. Alexander, Oakwood, Ohio, assignor to General Motors Corporation, Dayton, Ohio, a corporation of Delaware Application April 30, 1942, Serial No. 441,195

3 Claims. (Cl. 236—51)

This invention relates to a temperature control provided with an electrically operated temperature selecting means controlled from a remote point.

It is often more convenient and desirable to place temperature controls on or adjacent a temperature control apparatus or in certain ducts or in a special place in an air stream. Very often such locations are not convenient for selecting the temperature setting of the switch. Several forms of mechanically operated remote controls for temperature controls have been devised; but in many applications, particularly railroad cars, it has been the experience that such mechanical connections are undesirable. Separate non-adjustable thermostats have been used in sets, but this multiplies the expense.

It is an object of my invention to provide a remote control which will select the operating temperature or pressure of a temperature or pressure control and in which the only connections between the remote control and the temperature or pressure control are electrical conductors.

It is another object of my invention to provide a single temperature or pressure control with an electrically operated temperature or pressure selecting means.

It is still another object of my invention to provide a single temperature or pressure control with an electrically operated selective means providing definite temperature or pressure selections regardless of normal variations in the electrical supply.

These objects are attained by providing a bellows-operated thermostatic switch means with a plurality of electrically operated means capable of varying the effective force in different definite degrees of an adjusting spring for varying the temperatures at which the switch or control operates. A remote selection device is connectd by electrical conductors to the electrically operated means for selecting the temperatures at which the control is to operate.

Further objects and advantages will be apparent from the following description, reference being had to the accompanying drawing, wherein a preferred form of the present invention is clearly shown.

Figure 1:
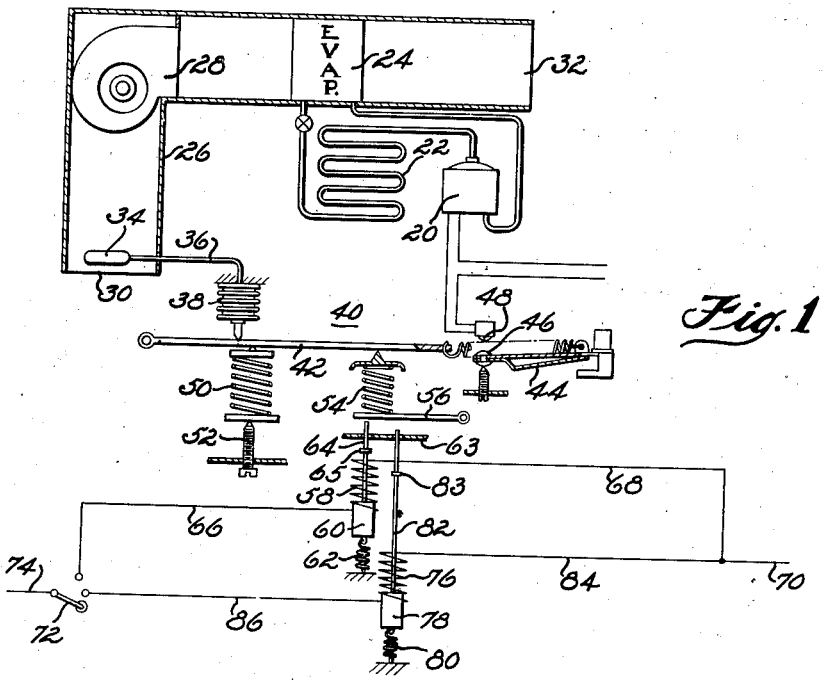
Fig. 1 is a diagrammatic view of one form of temperature control apparatus and temperature control therefor embodying one form of my invention.

Referring now to the drawing and more particularly to Fig. 1 there is shown a temperature control apparatus specifically a refrigerating system for cooling air. The refrigerating system proper includes a sealed unit 20 comprising a motor-compressor unit for compressing the refrigerant and for forwarding the compressed refrigerant to the condenser 22 where the compressed refrigerant is liquefied and forwarded under reduced pressure to an evaporator 24. The liquid refrigerant evaporates under reduced pressure in the evaporator 24 and is returned to the sealed unit 20. The evaporator 24 is located in a duct 26 for cooling the air circulated through the duct by a centrifugal fan 28.

Such a duct generally has its inlet 30 and its outlet 32 connected to the zone to be refrigerated. In order to control the operation of the refrigerating system in accordance with the temperature of the zone there is provided a thermostat bulb 34 located in the inlet air stream of the duct 26. The bulb 34 is provided with means such as a volatile liquid for creating an expansion which is conducted by capillary tube 36 to a flexible metal bellows 38 forming the motor of the temperature control 40. The expansion and contraction of the bellows 38 operates a primary lever 42 which is connected to a double toggle snap-action mechanism 44 carrying a movable contact 46 adapted to make and break contact with the stationary contact 48. The expansion of the bellows 38 is opposed by a coil spring 50, the tension of which is adjusted by an adjusting screw 52 to vary the relationship between the temperature of the bulb 34 and the opening and closing of the contacts 46 and 48. Normally, a knob and a dial are provided at the end of the screw 52 to change the temperature setting thereof as desired. Frequently, in order to place this knob and dial at a convenient place the entire control 40 has been moved to such a position. This requires a very long capillary tube 36 and there is considerable difficulty in properly installing a long tube of this type in many locations.

According to my invention, I provide a second temperature regulating spring 54, one end of which is normally held in engagement with the primary lever 42 and the other end of which is supported by a follower lever 56. In order to change the operating temperature of the control 40, I provide an electromagnet coil 58 which operates upon a solenoid 60 which is normally held retracted by a return spring 62. The solenoid or plunger 60 carries a pin 64, the upper end of which may bear lightly against the follower lever 56 when the coil 58 is energized. A stop 65 is provided which engages the support 63 to definitely set a limit to the change in the effective force of the spring 54. The coil 58 is connected to the electrical conductors 66 and 68 which in turn connects to one of the supply conductors 70. A selector switch 72 is adapted to connect the conductor 66 to the supply conductor 74 so that the electromagnet 58 will be energized to move the pin 64 until the stop 65 engages the support 63 to apply an additional accurately defined loading to the primary lever 42 for providing a definite change in the temperature or pressure setting of the control 40. This selector switch 72 is preferably located at some convenient remote point and connected with the control 40 only by electrical conductors.

In order to provide a second definite selective temperature adjustment, I provide a second electromagnet coil 76 which operates the solenoid or plunger 78 having a return spring 80 and a long rod 82 with its stop 83 further removed from the support 63 providing a greater travel and consequently a greater effective force of the spring 54 to provide a definite larger temperature or pressure variation of the temperature or pressure control 40. The electromagnet coil 76 is preferably provided with considerably more turns than the coil 58 so that the coil 76 will have more power to apply a greater tension or force to the spring 54. The coil 76 is connected by the conductor 84 to the supply conductor 70 and by the conductor 86 and the selector switch 72 to the supply conductor 74. Thus by this system, three accurate temperature or pressure settings of the temperature or pressure control 40 are possible, one in which the selector switch 72 does not connect the supply conductor 74 with any circuit, a second in which the selector switch connects the supply conductor 74 with the conductor 66, and a third in which the selector switch 72 connects the supply conductor 74 with the conductor 86.

Figure 2:
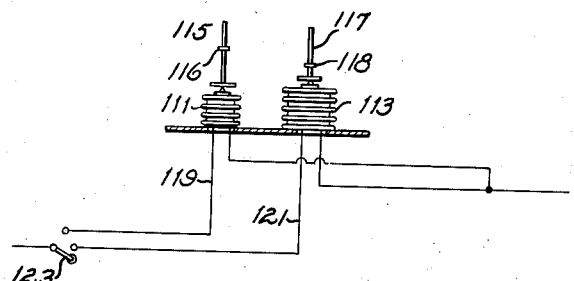
Fig. 2 is a view showing a modified form of electrically operated means for selecting the operating temperatures of the temperature control.

Other forms of electrically-operated means may be used for applying different amounts of force to the follower lever 56 and the spring 54. For example, in Fig. 2 there is shown a bellows 111 containing a small internal electric heater and a volatile liquid and a second bellows 113 larger in diameter and having a greater length. This second bellows is preferably provided with a larger heater and a volatile liquid which may be either the same or different from the volatile liquid with which the bellows 111 is charged. The bellows 111 is provided with an operating pin 115 and a stop 116 for providing a definite limited deflection of the follower lever 56 to change the effective force of the spring 54 while the bellows 113 is provided with an operating pin 117 and a stop 118 to provide a greater definite change in the effective force of the spring 54. The heaters in the two bellows 111 and 113 are connected in different electric circuits 119 and 121 both of which are under the control of a remotely located temperature selector switch 123.

Figure 3:
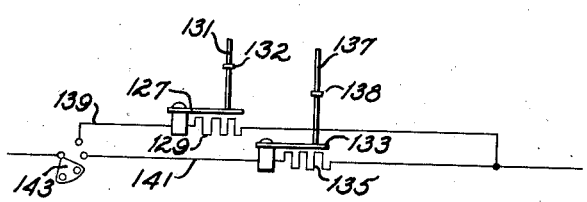
Fig. 3 is a diagrammatic view illustrating another form of electrically operated means for changing or selecting the operating temperatures of the temperature control.

In Fig. 3 is shown still another electrically operated means which includes a bimetal 127 capable of being heated by an electric heater 129 for operating a pin 131 provided with a stop 132 to provide a definite limited deflection of the follower lever 56 for the purpose of providing a definite change in the effective force of the spring 54. The second bimetal 133, heated by an electric heater 135 when energized, operates a pin 137 provided with a stop 138 to provide in conjunction with the pin 131 a greater definite deflection of the lever follower 56 for changing the effective force of the spring 54. The bimetal 133 is provided with a greater travel than the bimetal 127 by providing the heater 135 with a larger heating capacity than the heater 129. This causes the bimetal 133 to compress the spring 54 to a greater extent than the bimetal 127 when heated. The heaters 129 and 135 are connected in parallel electric circuits 139 and 141 under control of a fan type selector switch 143 which is located at a remote or convenient point. This fan type selector switch can be moved to energize either or both heaters 129 and 135.

While the form of embodiment of the invention as herein disclosed, constitutes a preferred form it is to be understood that other forms might be adopted, all coming within the scope of the claims which follow.

What is claimed is as follows:

1. A temperature control including a thermally responsive motor means, a control means operated by the motor means in response to temperature changes, a single spring connected to the motor means for varying the operation of the control means, a first simple electrothermal mechanical power generating means for adjusting said spring to a first tension, a second simple electrothermal mechanical power generating means for adjusting said spring to a different tension, a selective remote electrical control device for selectively energizing either or both of said electrothermal means, and electrical conductor means connecting said remote control device and said electrothermal means.

2. A pressure control including a pressure responsive motor means, a control means operated by the motor means in response to pressure changes, a single spring connected to the motor means for varying the operation of the control means, means for setting said spring to a first tension, a simple electrothermal mechanical power generating means having a lost motion connection with said spring for adjusting said spring to a second tension, said electrothermal means being disconnected from said spring by said lost motion connection when deenergized, a remote electrical control device for controlling the energization of said electrothermal means, and electrical conductor means connecting said remote control device and said electrothermal means.

3. A temperature control including a thermally responsive motor means, a control means operated by the motor means in response to temperature changes, a single spring connected to the motor means for varying the operation of the control means, means for setting said spring to a first tension, electrically operated mechanical power generating means having a lost motion connection with said spring for adjusting said spring to a second tension, said electrically operated means being disconnected by the lost motion connection from said spring when denergized, a remote electrical control device for controlling the energization of said electrically operated means, and electrical conductor means connecting said remote control device and said electrically operated means.

DONALD F. ALEXANDER.